United States Patent
Colao et al.

(10) Patent No.: US 9,793,697 B1
(45) Date of Patent: Oct. 17, 2017

(54) JUNCTION BOX AND PLUG-INS

(71) Applicants: Michael Colao, Thousand Oaks, CA (US); Shannon Gaither, San Jose, CA (US)

(72) Inventors: Michael Colao, Thousand Oaks, CA (US); Shannon Gaither, San Jose, CA (US)

( * ) Notice: Subject to any disclaimer, the term of this patent is extended or adjusted under 35 U.S.C. 154(b) by 0 days.

(21) Appl. No.: 15/076,989

(22) Filed: Mar. 22, 2016

Related U.S. Application Data

(60) Provisional application No. 62/147,768, filed on Apr. 15, 2015.

(51) Int. Cl.
*H01R 13/60* (2006.01)
*H02G 3/16* (2006.01)

(52) U.S. Cl.
CPC ..................... *H02G 3/16* (2013.01)

(58) Field of Classification Search
CPC .................... H02G 3/16; H02G 3/08
USPC ...... 439/535, 373, 536, 538, 620.21, 620.29
See application file for complete search history.

(56) References Cited

U.S. PATENT DOCUMENTS

| | | | | |
|---|---|---|---|---|
| 5,397,929 A * | 3/1995 | Hogarth | ............... | H01R 27/02 307/140 |
| 6,617,511 B2 * | 9/2003 | Schultz | ............... | H01R 24/70 174/50 |
| 7,109,414 B2 * | 9/2006 | Reynolds | ............... | H02G 3/086 174/50 |
| 7,705,239 B2 * | 4/2010 | Gates | ............... | H01R 13/508 174/481 |
| 8,415,561 B2 * | 4/2013 | Gates | ............... | H01R 13/508 174/481 |
| 8,500,480 B2 * | 8/2013 | van Beveren | ............ | H02G 3/00 439/345 |
| 8,575,484 B1 * | 11/2013 | Witherbee | .............. | H02G 3/126 174/50 |
| 8,727,804 B2 * | 5/2014 | McNeely | ............. | A61B 5/0006 439/502 |
| 8,742,680 B2 * | 6/2014 | Cowburn | ............... | H05B 37/02 315/132 |
| 9,188,318 B2 * | 11/2015 | Tickner | ................... | F21V 21/03 |
| 2008/0053698 A1 * | 3/2008 | Purves | ..................... | H02G 3/16 174/520 |
| 2011/0230075 A1 * | 9/2011 | Van Beveren | .......... | H02G 3/00 439/345 |
| 2013/0221868 A1 * | 8/2013 | Diotte | ................... | F21V 33/006 315/227 R |
| 2015/0050831 A1 * | 2/2015 | Tanaka | .................. | H01R 4/183 439/502 |

(Continued)

*Primary Examiner* — Tulsidas C Patel
*Assistant Examiner* — Peter G Leigh

(57) ABSTRACT

A junction box assembly is presented. The junction box has a top side, left side, right side, bottom side and rear side which define a space therein. The junction box assembly also features a plurality of openings within at least one of the sides. An interface is disposed within the junction box assembly and has a plurality of connectors disposed thereon, the interface capable of receiving a wire through said at least one opening and wherein said wire is capable of being placed in electrical and mechanical communication with at least one of the connectors. The junction box assembly is capable of receiving a plug-in inserted therein and providing electrical communication between the wire and the plug-in through said at least one of the connectors.

20 Claims, 16 Drawing Sheets

(56) References Cited

U.S. PATENT DOCUMENTS

2015/0138832 A1* 5/2015 Tickner .................. F21V 21/03
362/609

* cited by examiner

JUNCTION BOX AND PLUG-INS

CROSS REFERENCE TO RELATED APPLICATIONS

The present application claims the benefit of U.S. Provisional Patent Application No. 62/147,768, filed on Apr. 15, 2015, which is incorporated herein by reference in its entirety.

BACKGROUND

Conventional junction boxes are well known and used everywhere. The box is mounted to a stud or wall and houses an electrical device (e.g. a switch, an outlet, a dimmer switch or the like). For a typical junction box, Alternating Current (A.C.) wires, typically called Romex, are fed into the box, while other wires may also be fed into the box and/or are fed out of the box. Romex comprises three wires in a sheath. The wires have to be stripped and mounted to the electrical device. For a conventional A.C. outlet a Romex set input set of wires are received inside the junction box. The outer covering is stripped back, revealing three conductors, typically a conductor having black insulation, a conductor having a white insulator and a non-insulated bare wire.

The stripped wires must be attached to a device which is attachable to the junction box. For example, if a 120 volt outlet was to be installed, the stripped black insulated wire is attached to one side of the out let by way of a screw or other means. The stripped white insulated wire is attached to the opposite side of the outlet by way of a screw or other means. The bare wire is attached to the ground lug of the outlet, again by screw or other means. A similar situation exists when using 3 wire Romex, wherein an additional wire (Red) is stripped and attached to the plug by a screw or alternate means. All of this must be done with the A.C. power turned off for safety considerations. In some situations there may be a need to provide A.C. out of the box and on to another box. The connections for this Romex wiring leaving the junction box must also be made, either by way of multiple connections on the electrical device or wire-to-wire connections using pigtails, wirenuts or the like. This can result in a nest of wires inside the junction box.

SUMMARY

Conventional junction boxes, such as those explained above, suffer from a variety of deficiencies. One such deficiency is that the resulting wires inside the box can become messy and lead to problems with short circuits, open circuits, and be difficult to diagnose in the event of an electrical problem. Further, any changes to the device used with the junction box require power being turned off and multiple removal and/or additions of connections within the box. Embodiments of the invention significantly overcome such deficiencies.

This presently described junction box assembly will take electrical wiring (110V-220V) and allow a user to plug it in and not use the wire connectors (pigtail) wiring clips again. The difference would be the number of plugs in and out on 110V versus 220V. The same aspects of the design don't change, it is just the inputs and outputs that need to grow or shrink. With all the inputs and outputs, a user plugs the wiring into the box and plug any traveling wires (that might go to another electrical location) to continue the flow of electricity.

In a particular embodiment the junction box assembly comprises a box having a left side; a top side in mechanical communication with the left side; a right side in mechanical communication with the top side; a bottom side in mechanical communication with the left side and the right side; a rear side in mechanical communication with the left side, the right side, the top side and the bottom side, and wherein the top side, the left side, the right side, the bottom side and the rear side define a space therein. The box further includes a plurality of openings within at least one of the top side, the left side, the right side, the bottom side and the rear side. Additionally the junction box assembly includes an interface disposed within the space, the interface having a plurality of connectors disposed thereon, the interface capable of receiving a wire through the at least one opening and wherein the wire is capable of being placed in electrical and mechanical communication with at least one of the connectors. The junction box assembly is further capable of receiving a plug-in inserted therein and providing electrical communication between the wire and the plug-in through the at least one of the connectors.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
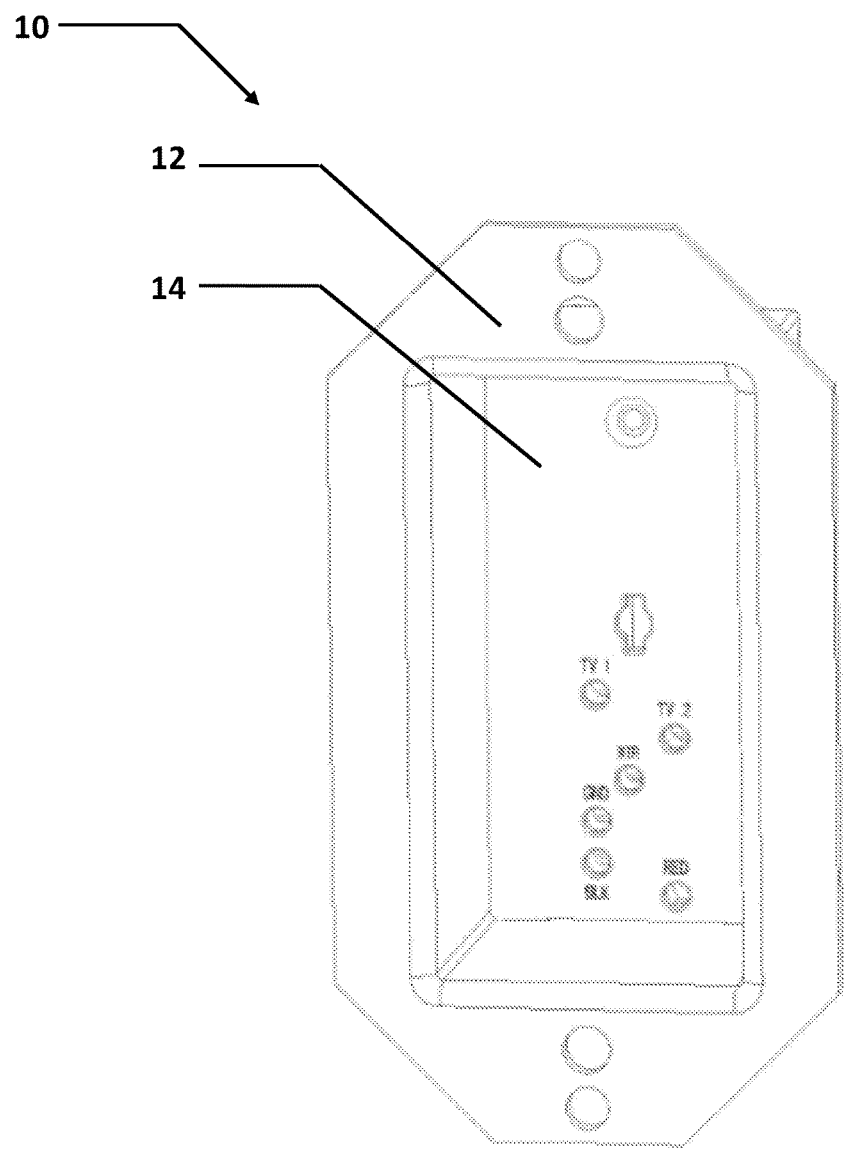
FIG. 1 depicts an isometric front view of the junction box assembly in accordance with embodiments of the invention.
Figure 2:
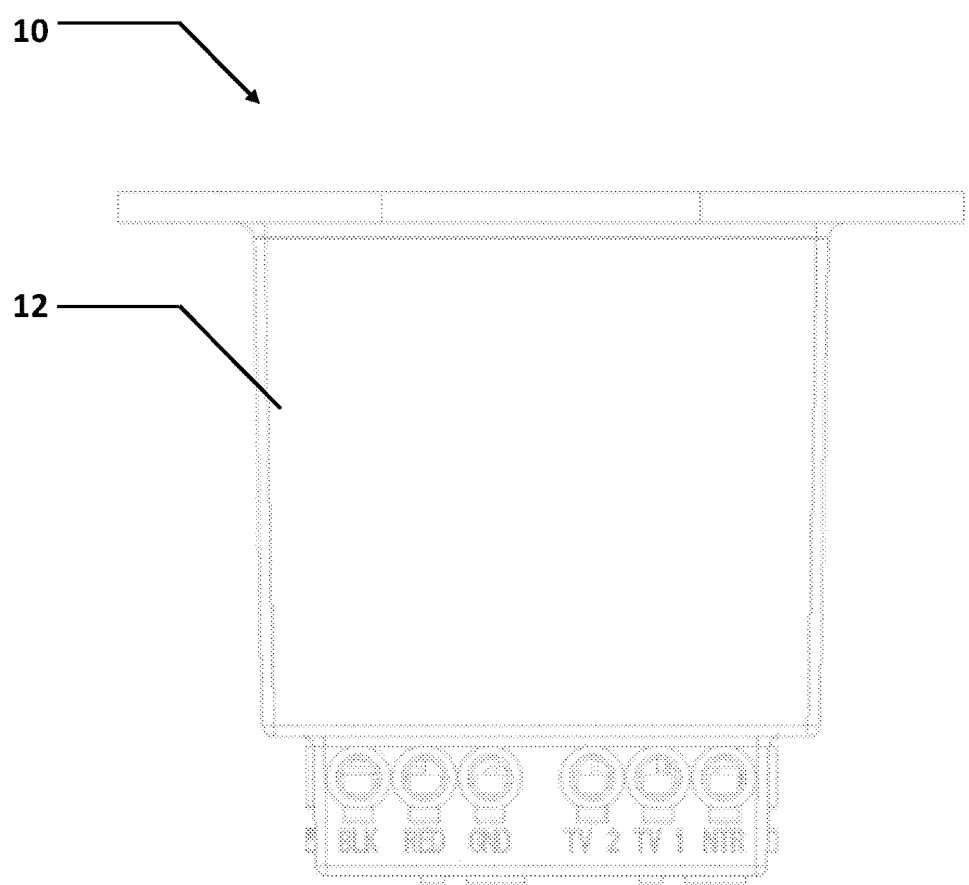
FIG. 2 depicts a top view of the junction box in accordance with embodiments of the invention.
Figure 3:
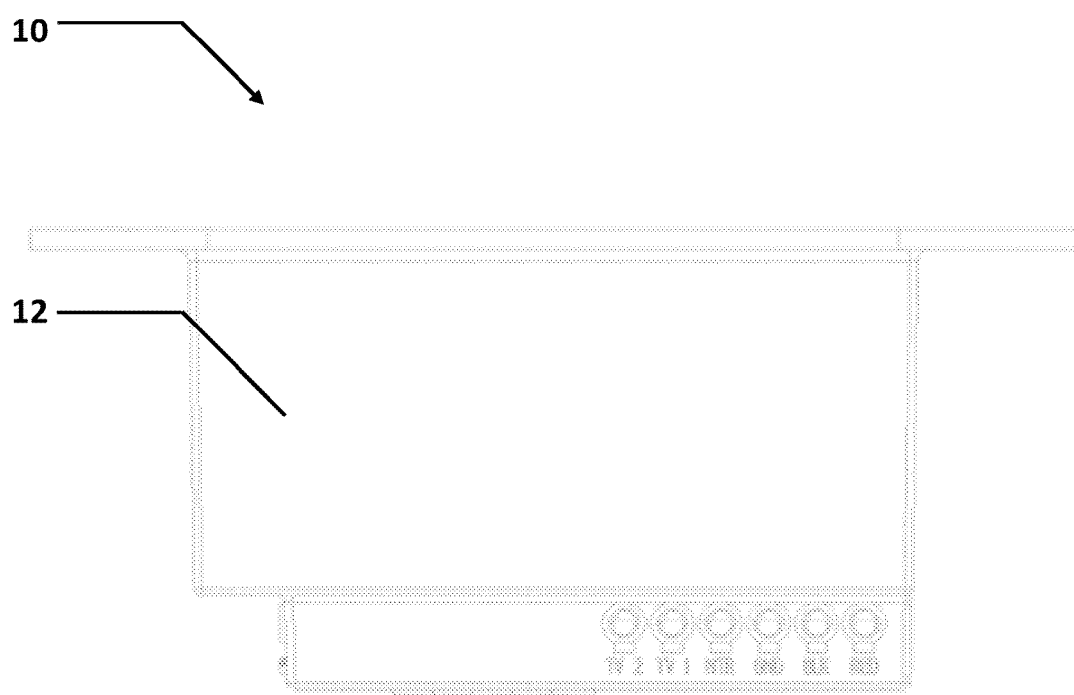
FIG. 3 depicts a right side view of the junction box in accordance with embodiments of the invention.
Figure 4:
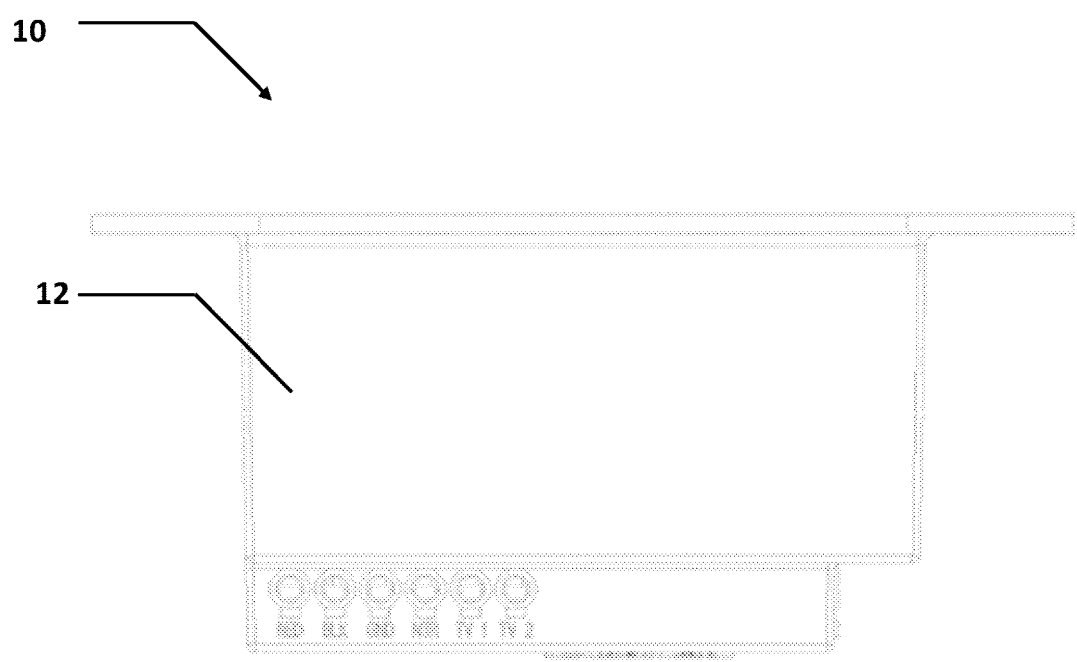
FIG. 4 depicts a left side view of the junction box in accordance with embodiments of the invention.
Figure 5:
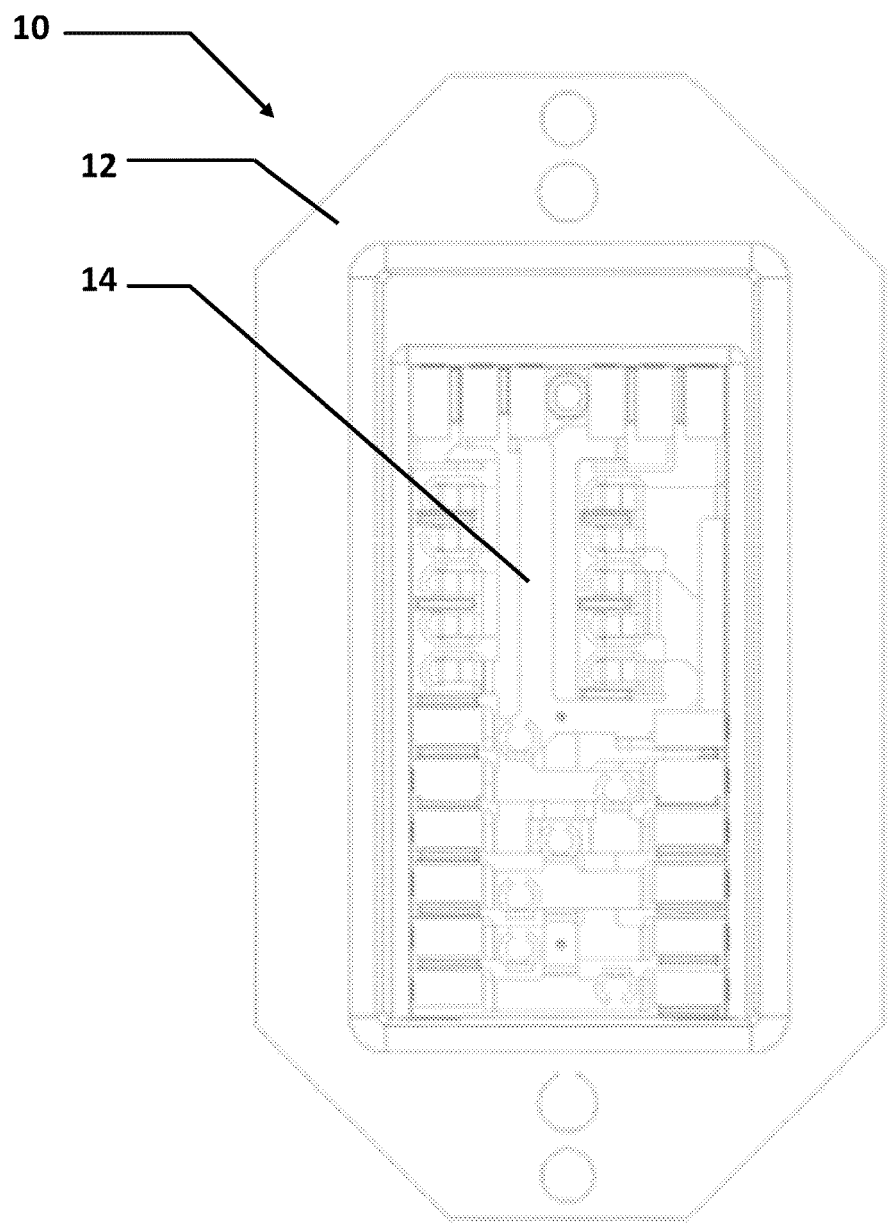
FIG. 5 depicts a front view of the junction box assembly in accordance with embodiments of the invention.
Figure 6:
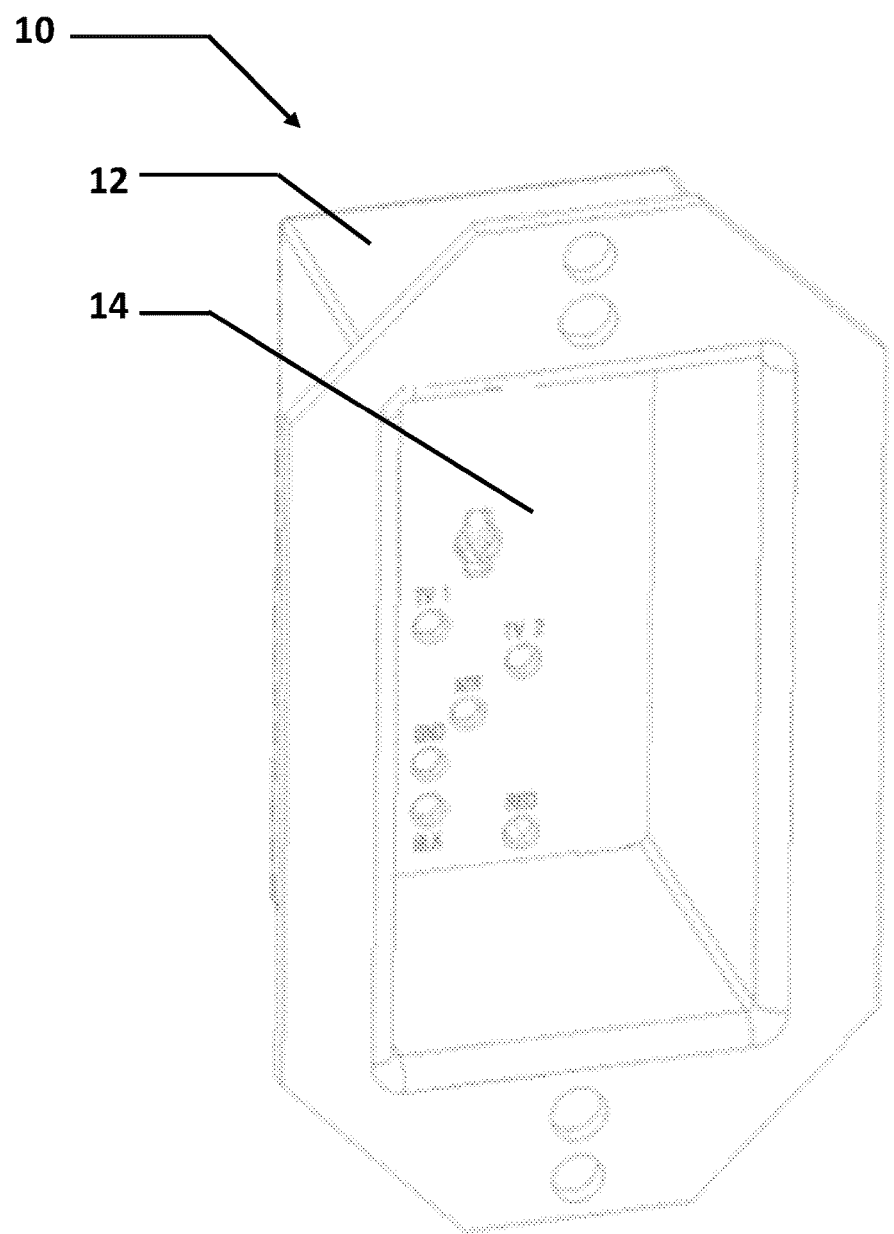
FIG. 6 depicts an isometric front view of the junction box assembly in accordance with embodiments of the invention.
Figure 7:
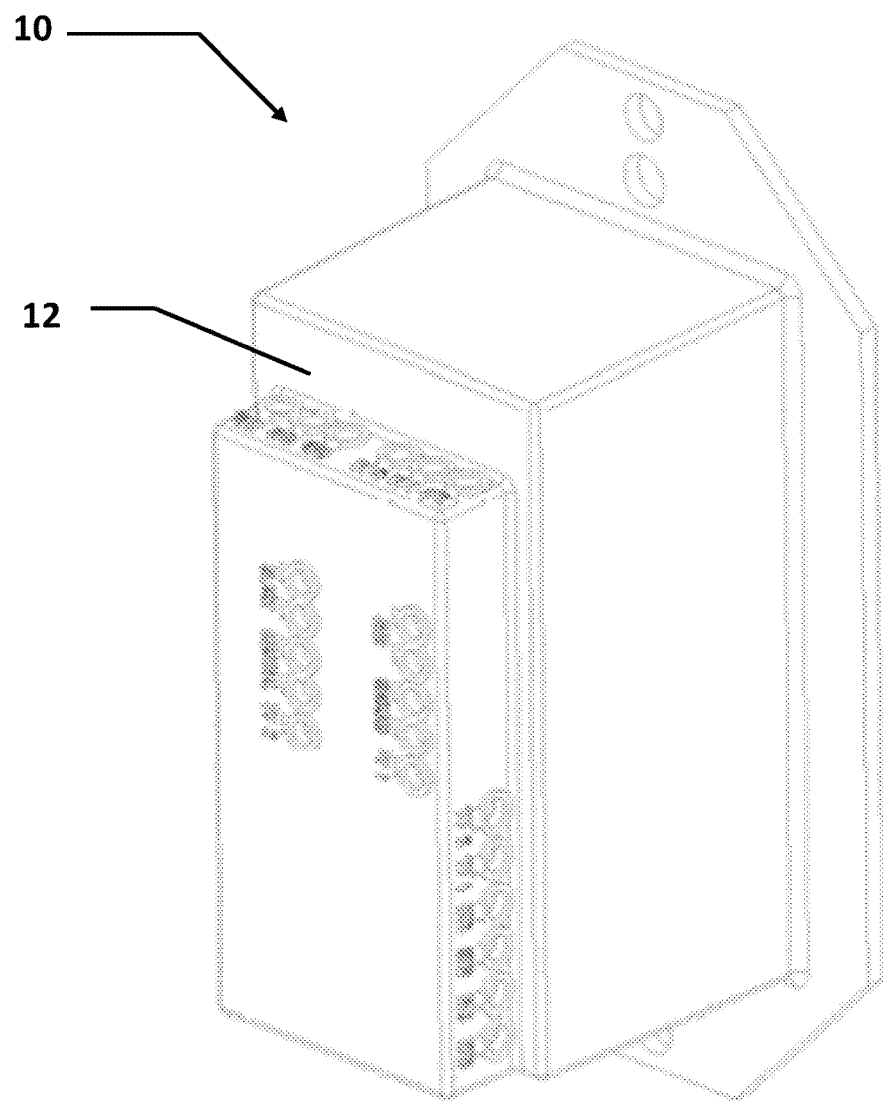
FIG. 7 depicts an isometric rear view of the junction box assembly in accordance with embodiments of the invention.
Figure 8:
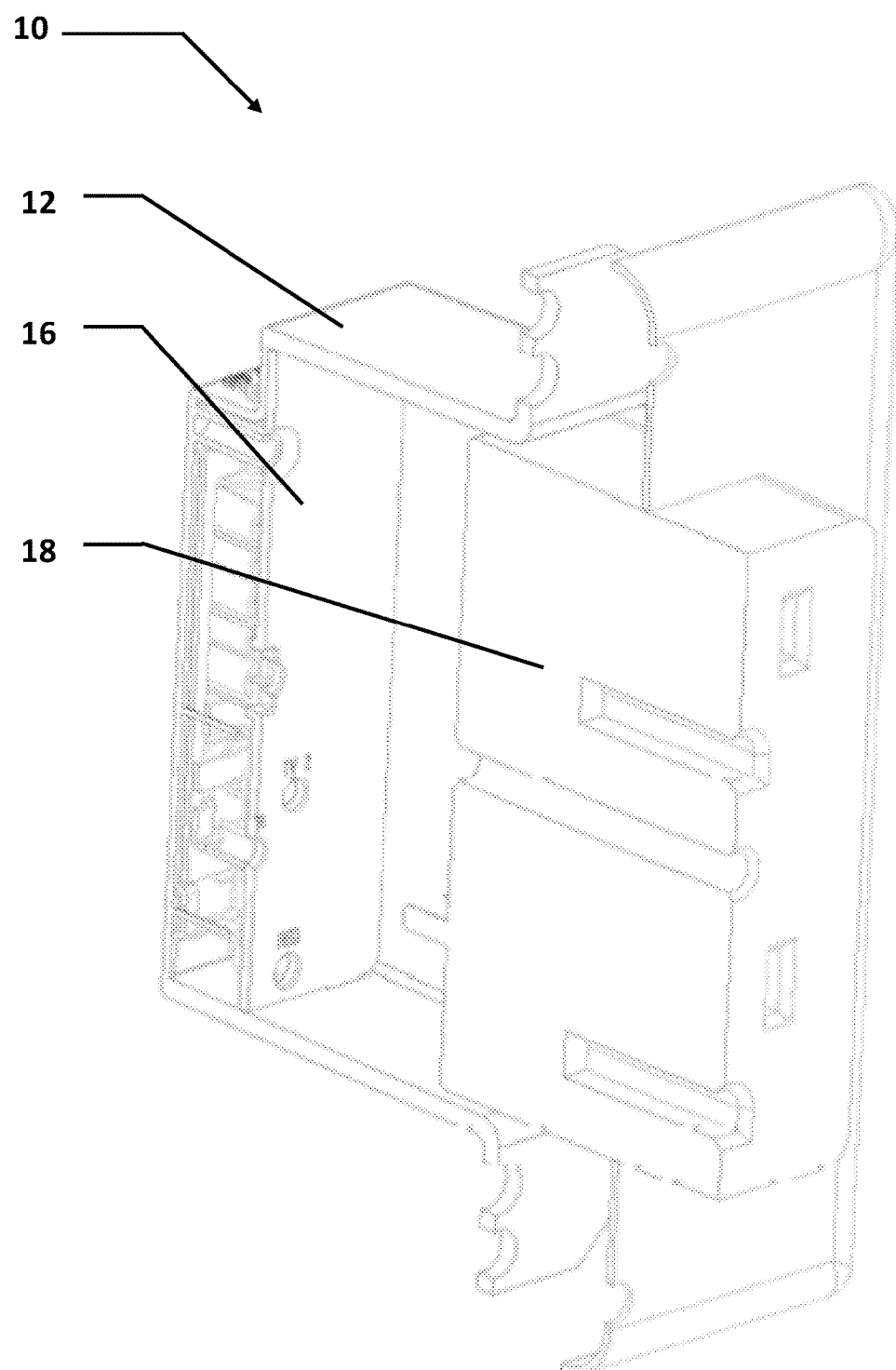
FIG. 8 depicts an isometric cut-away right side view of the junction box assembly in accordance with embodiments of the invention.
Figure 9:
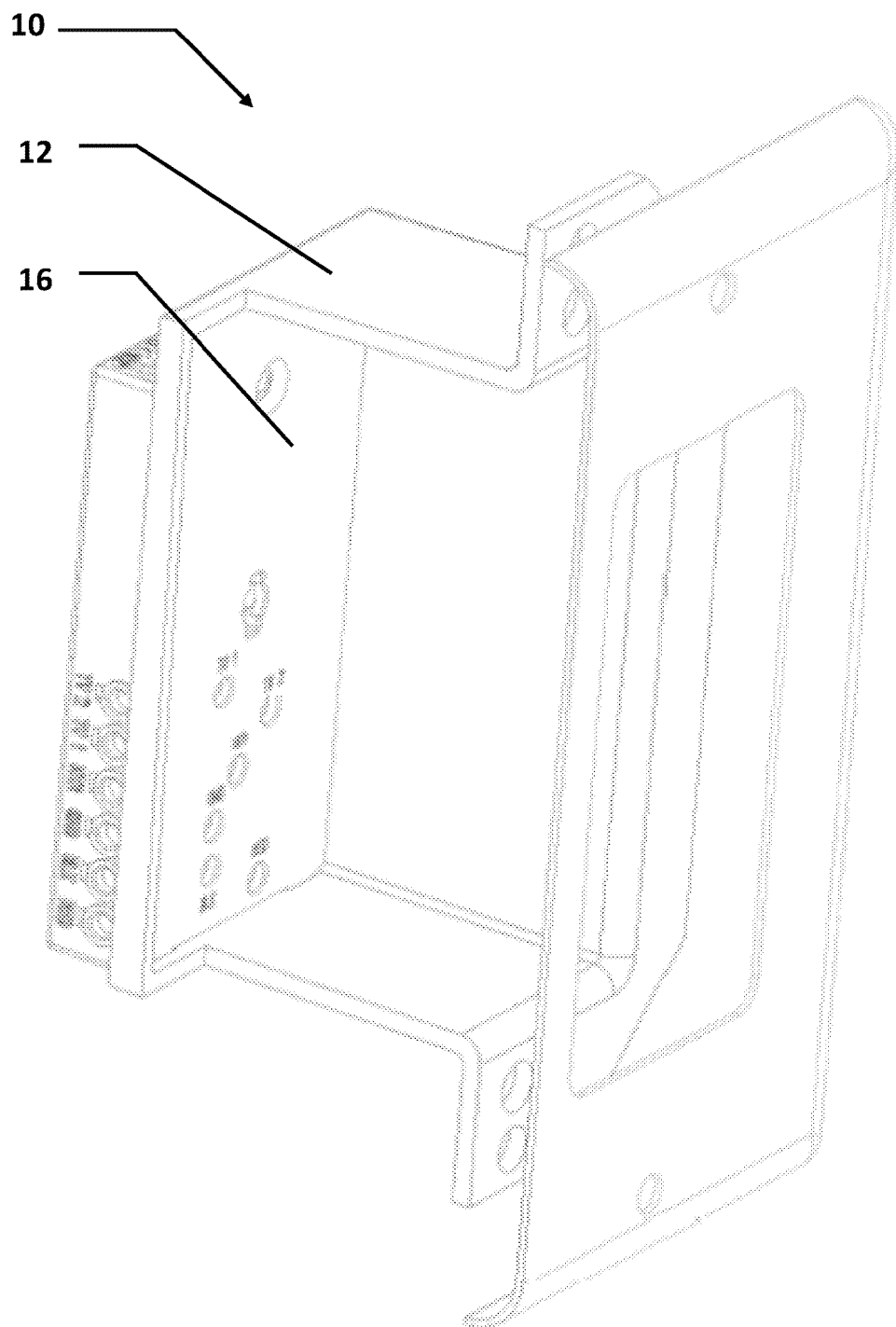
FIG. 9 depicts an isometric cut-away right side view of the junction box assembly in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Referring to FIGS. 1-11, 15, and 16, a first embodiment of the junction box assembly 10 is shown. The assembly 10 includes a junction box 12 and an interface 14 disposable within the junction box 12. The junction box 12 is similar in size and shape as a conventional junction box, and can replace conventional junction boxes in all applications. The junction box assembly will be described with respect to 120 volt A.C. wiring environment, but it should be understood that the junction box has applications for different voltages (e.g., 240 volts, Direct Current (D.C.) voltages, different types of conductors (electrical, television, network, Universal Serial Bus (USB), communications, etc.).

Figure 10:
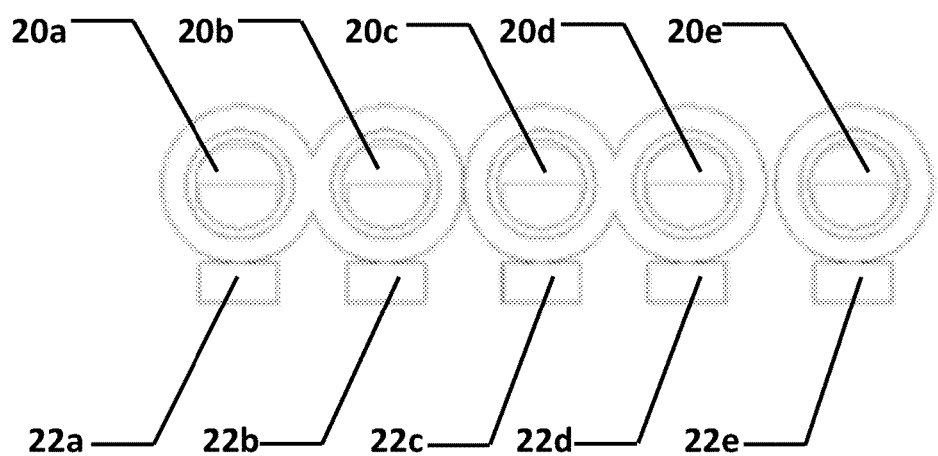
FIG. 10 depicts a view of the rear connectors of the junction box in accordance with embodiments of the invention.
Figure 11:
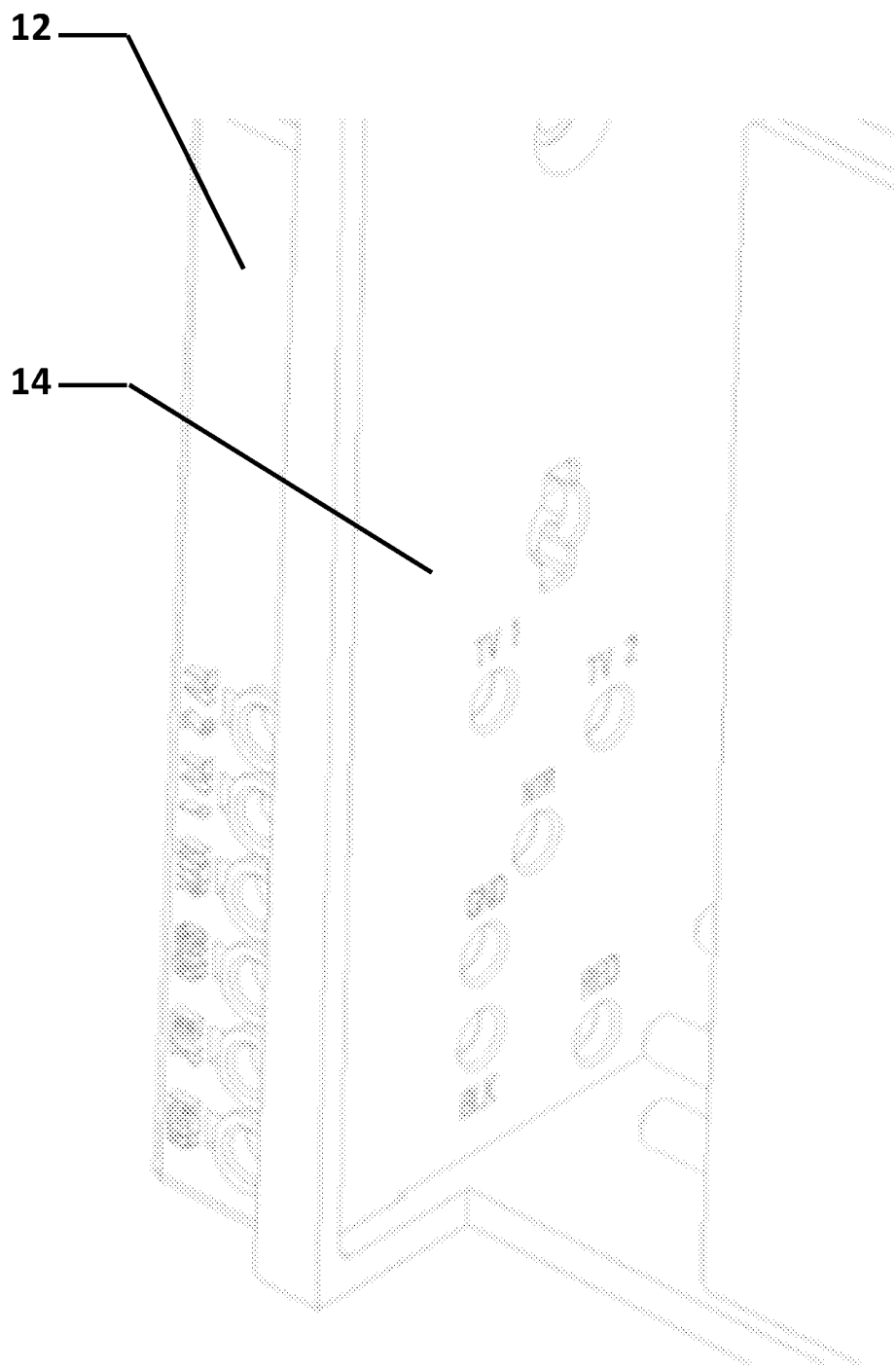
FIG. 11 depicts an isometric view of the interface of the junction box assembly in accordance with embodiments of the invention.

The interface 14 comprises a circuit board having multiple connectors (male and/or female) on both a front surface and a rear surface. There are inputs/outputs on all sides of the junction box so that a user can plug into from any side the electrical wiring comes in and which attached to connectors on the rear side of interface 14. In some embodiments there is also a locking center pin so that it allows anything being plugged in to stay in place. The wiring inside of this box can be in any direction to pass the electricity through the box. A user can also remove the wires (the wires connecting to the outside of the junction/gang box) if needed. Based on the drawings the wires would "plug" into the box where they would enter through the opening in the junction box 12 and be received and secured in place by a connector on interface 14. As shown in FIG. 10, the rectangular holes (22a-22e) will allow a user to insert a screwdriver like tool inside to the release the wiring that is plugged in above (in the round shaped holes 20a-20e).

Also shown is a cover plate 16 that goes in front of the interface 14 therefore not exposing the interface itself. Interface 14 has plug like inlets so that a user can plug a component (also referred to herein as a plug-in) 18 into it. Things like this could include but are not limited to; wall outlets, light switches, low voltage USB plugs, and appliances including lights, sound devices, heating devices and cooling devices. In such a manner the junction box only needs to be wired a single time, by having wires plugged into the box and into mechanical and electrical communication to the interface. The interface also has front connectors which are used to provide connections from the wires plugged into the rear of interface 14 to components 18 inserted into the junction box 12 and mated with interface 14.

The component 18 will have matching prongs/plugs to go into the junction box so that it maps to the right inputs/outputs needed to connect to power. As shown in the Figures the component 18 will receive the power and or signals from the box and pass it to any component configuration on the front. Again, this could be female or male although only the male version is shown.

A component 18 is slid into the junction box 12 and secured in place. The component 18 has connectors which are located to mate with the appropriate connectors on the interface 14. For example, if the component 18 was an A.C. outlet, it would have connectors that would mate with the appropriate connectors on interface 14 to provide 120 volts at the outlet. For a different component, (e.g., a light switch) the component would be slid into the junction box 12 and would have a different set of connectors than the A.C. outlet component.

By way of the above described junction box assembly 10 and components, installation is much quicker and less labor intensive. If a user desired to replace a light switch with a dimmer switch, the user merely removes the switch component from the junction box and slides the dimmer component into the junction box. There is no need to turn off power or mess with a nest of wires.

Figure 12:
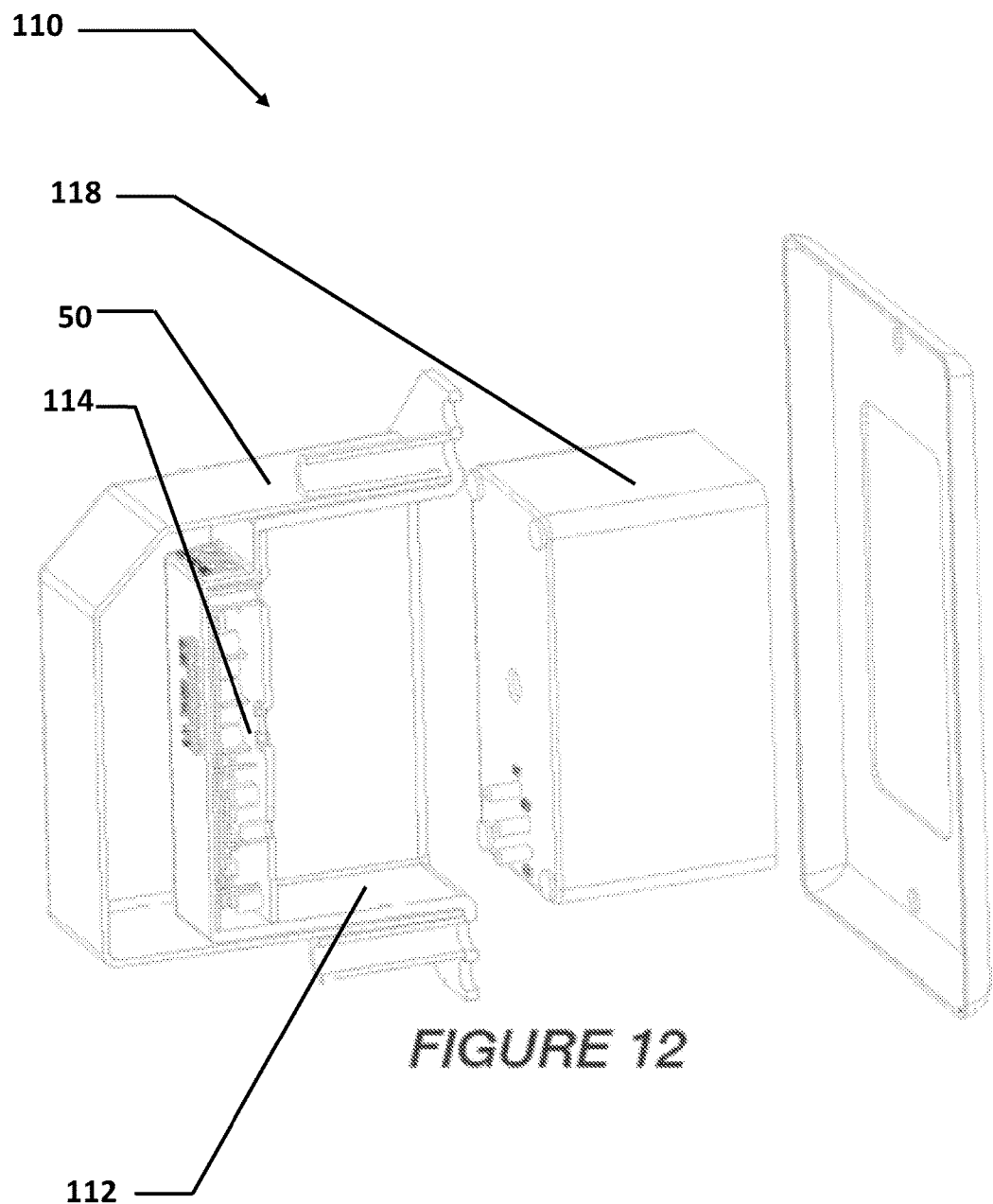
FIG. 12 depicts an exploded isometric partial cut-away right side view of a second embodiment of the junction box assembly in accordance with embodiments of the invention.
Figure 13:
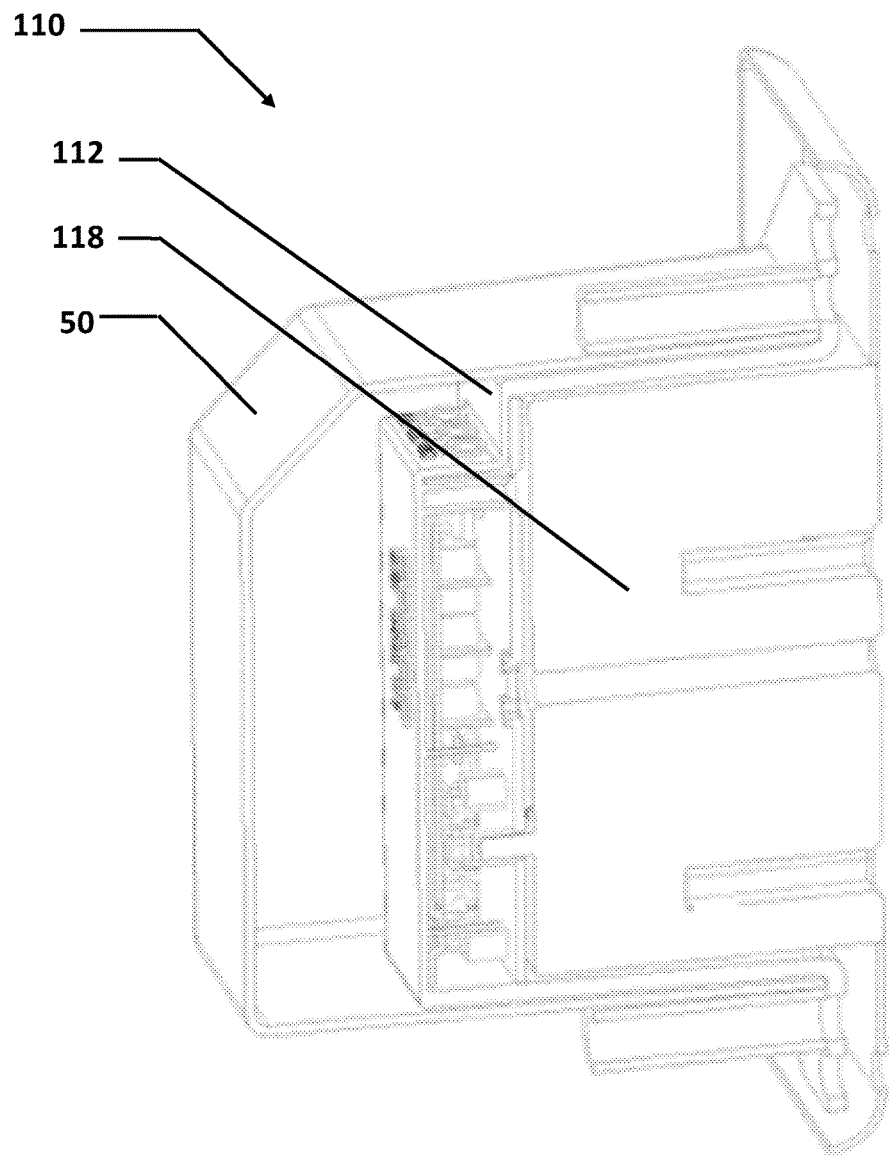
FIG. 13 depicts an isometric partial cut-away right side view of a second embodiment of the junction box assembly in accordance with embodiments of the invention.
Figure 14:
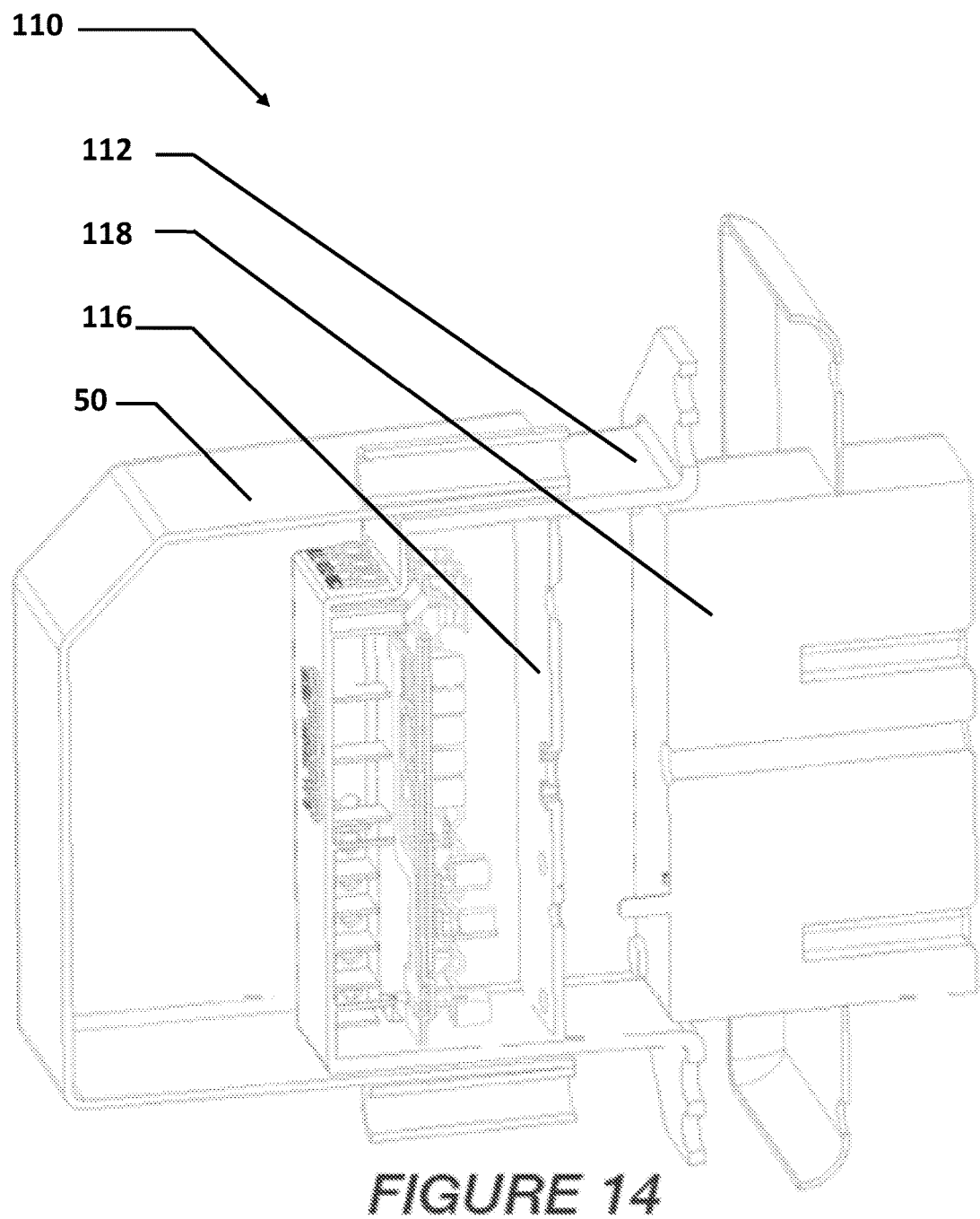
FIG. 14 depicts an exploded isometric partial cut-away right side view of a further embodiment of the junction box assembly in accordance with embodiments of the invention.
Figure 15:
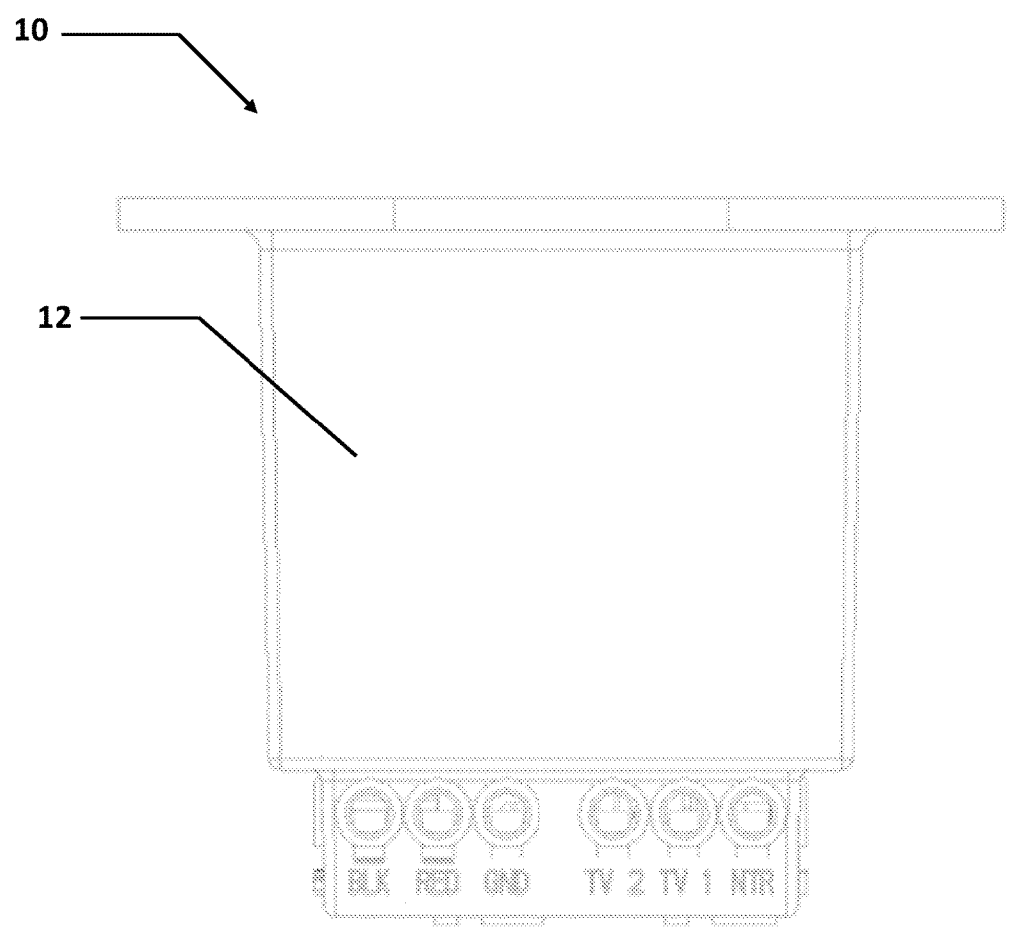
FIG. 15 depicts a bottom view of the junction box in accordance with embodiments of the invention.
Figure 16:
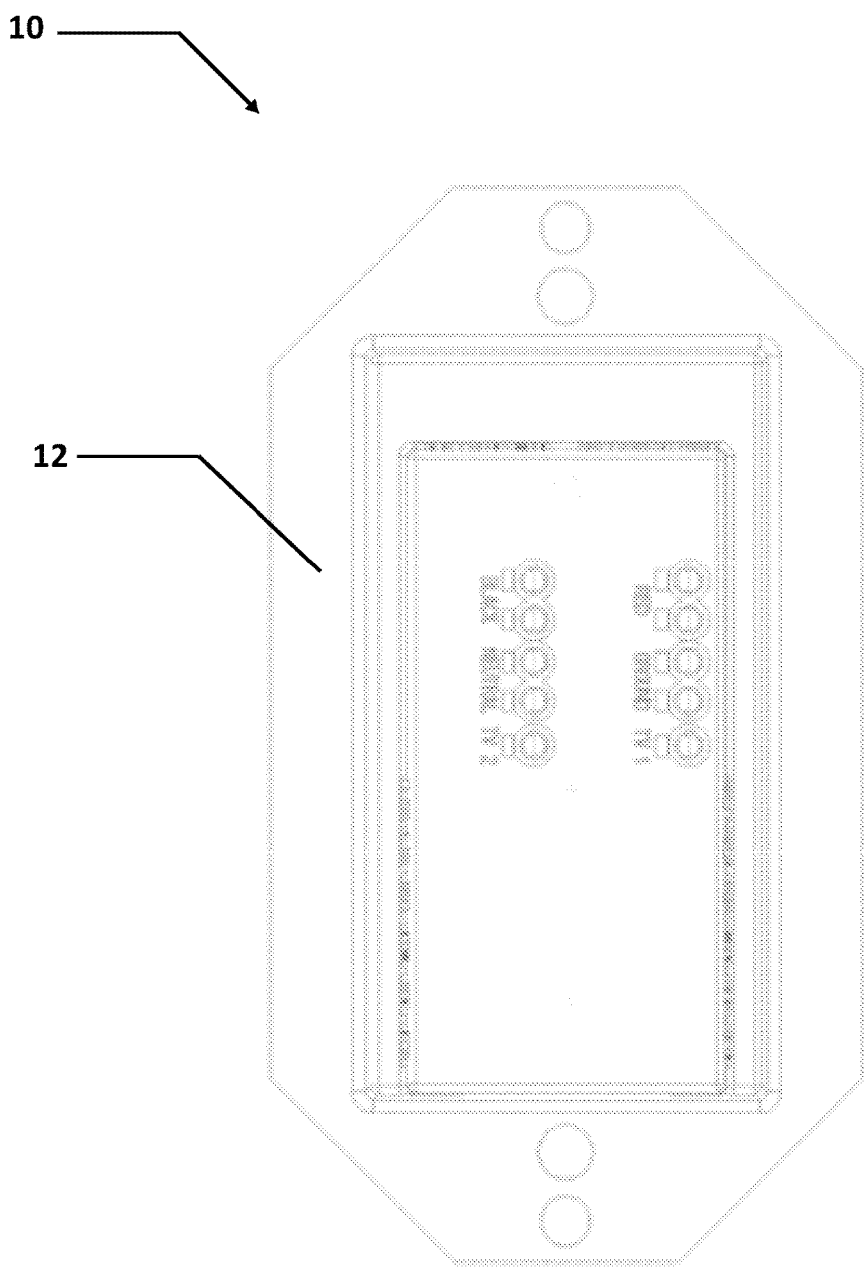
FIG. 16 depicts a back view of the junction box in accordance with embodiments of the invention.

Referring now to FIGS. 12-14, an additional embodiment of a junction box assembly 110 is shown. This embodiment is a retro-fit version, and allows the retrofit junction box 112 to fit inside an existing conventional junction box 50. This is useful for existing structures and removes the need to replace the existing junction box 50 which may require removing wall sections or crawling into crawl spaces or attic and the like. The user can simply remove any components from the existing junction box 50, connect the wires to the retrofit junction box 112 and insert and secure the retrofit junction box 112 into the existing junction box 50. The retrofit junction box 112 has a similar interface 114 and cover plate 116 as described with respect to interface 14 and cover plate 16, just sized to fit within the retrofit junction box 112.

In certain embodiments a safety mechanism may be employed to prevent power from being available at the front side of the interface connectors until a component is inserted. This can be mechanically (via a key, tab or similar element) or electrically (relays, switches, transistors or the like).

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

What is claimed is:

1. A junction box assembly comprising:
   a junction box comprising:
      a left side;
      a top side in mechanical communication with said left side;
      a right side in mechanical communication with said top side;
      a bottom side in mechanical communication with said left side and said right side;
      a rear side in mechanical communication with said left side, said right side, said top side and said bottom side, and wherein said top side, said left side, said right side, said bottom side and said rear side define a space therein; and
      an interface having a plurality of connectors comprising first connectors that connect to wires from an AC (alternating current) source, and second connectors that connect to the AC source via the first connectors, the first connectors comprising at least two connectors one each of the left side, top side, right side, bottom side and rear side; and
   a component comprising connectors that are oriented relative to, and mated directly with, the second connectors of the junction box interface by mechanically mounting the component to the junction box, whereby the component connects to the second connectors without wires.

2. The junction box assembly of claim 1 wherein said component comprises a type selected from an electrical outlet, a switch and a USB plug.

3. The junction box assembly of claim 2 wherein the component is a first type of component, and further comprising a second component of a second type comprising connectors that are oriented relative to, and mated with, the second connectors of the junction box interface by mechanically mounting the second component to the junction box after removing the first component from the junction box.

4. The junction box assembly of claim 1 wherein said interface includes third connectors for receiving a communications signal.

5. The junction box assembly of claim 4 wherein said communications signal is selected from the group consisting of television (TV), cable, telephone, network, and communications.

6. The junction box assembly of claim 1 further comprising a cover plate disposed within said junction box and covering a front surface of said interface.

7. The junction box assembly of claim 1 further comprising a lock securing said wire to said connector of said interface.

8. The junction box assembly of claim 1 further comprising a safety mechanism preventing power from being available at the second connectors until the component is mounted to the junction box.

9. The junction box assembly of claim 1 wherein said safety mechanism is mechanical.

10. The junction box assembly of claim 1 wherein said safety mechanism is electrical.

11. The junction box assembly of claim 1 wherein said junction box comprises a retrofit junction box and is sized to fit within a conventional junction box.

12. The junction box assembly of claim 11 wherein said retrofit junction box is removably securable within said conventional junction box.

13. An apparatus comprising:
   a junction box comprising a body, first connectors that connect to wires from an AC (alternating current) source, and second connectors that receive power from the AC source via the first connectors; and
   a component comprising a body that is oriented relative to the junction box by the junction box body, whereby connectors of the component are directly connected to the second connectors of the junction box and placed in electrical communication with the AC source by sliding the component body into the junction box body.

14. The apparatus of claim 13 wherein said component is removably securable within the junction box.

15. The apparatus of claim 13 wherein said component comprises an electrical outlet, switch or low voltage USB plug.

16. The apparatus of claim 15 wherein the component is a first component, and further comprising a second component comprising a body that is oriented relative to the junction box by the junction box body, whereby connectors of the second component are connected to the second connectors of the junction box and placed in electrical communication with the AC source by sliding the component body into the junction box body after removing the first component from the junction box.

17. The apparatus of claim 15 wherein said component provides a communications signal at an output.

18. The apparatus of claim 17 wherein said communications signal is selected from the group consisting of television (TV), cable, telephone, network, and communications.

19. The apparatus of claim 15 wherein said component comprises an appliance.

20. The apparatus of claim 15 wherein said appliance provides one of the group consisting of light, sound, heating or cooling.

\* \* \* \* \*